United States Patent
Cheon et al.

(10) Patent No.: US 8,203,544 B2
(45) Date of Patent: Jun. 19, 2012

(54) INPUT DEVICE AND MOBILE COMMUNICATION DEVICE HAVING SAME

(75) Inventors: Jee-Young Cheon, Seoul (KR); Kyung Ik Lee, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 730 days.

(21) Appl. No.: 11/776,395

(22) Filed: Jul. 11, 2007

(65) Prior Publication Data

US 2008/0204430 A1 Aug. 28, 2008

(30) Foreign Application Priority Data

Feb. 28, 2007 (KR) ........................ 10-2007-0020416

(51) Int. Cl.
*G06F 3/033* (2006.01)
(52) U.S. Cl. ........................................ 345/184; 345/156
(58) Field of Classification Search .................. 345/167, 345/173, 184
See application file for complete search history.

(56) References Cited

U.S. PATENT DOCUMENTS

| | | | |
|---|---|---|---|
| 4,866,221 A | 9/1989 | Obermann et al. | |
| 5,012,230 A | 4/1991 | Yasuda | |
| 5,412,165 A | 5/1995 | Malone et al. | |
| 6,340,800 B1 | 1/2002 | Zhai et al. | |
| 6,410,866 B1 | 6/2002 | Klein et al. | |
| 6,694,236 B2 | 2/2004 | Onodera | |
| 7,373,229 B2 | 5/2008 | Szczerba et al. | |
| 7,429,978 B2 | 9/2008 | Yoshioka | |
| 7,436,398 B2 | 10/2008 | Yuasa et al. | |
| 7,518,745 B2 | 4/2009 | Guerraz et al. | |
| 2004/0164963 A1* | 8/2004 | Ono et al. ..................... | 345/167 |
| 2005/0156898 A1 | 7/2005 | Yoshioka | |
| 2007/0159459 A1* | 7/2007 | Wang ............................ | 345/156 |
| 2007/0188466 A1* | 8/2007 | Lee et al. ...................... | 345/167 |
| 2007/0236472 A1* | 10/2007 | Bentsen et al. ............... | 345/173 |
| 2008/0114588 A1* | 5/2008 | Scott et al. ........................ | 704/8 |
| 2008/0163116 A1* | 7/2008 | Lee et al. ...................... | 715/815 |

FOREIGN PATENT DOCUMENTS

| | | |
|---|---|---|
| CN | 1487766 A | 4/2004 |
| EP | 1357510 A1 | 10/2003 |
| RU | 2275674 C2 | 4/2006 |
| WO | WO 2005/057396 A1 | 6/2005 |

* cited by examiner

*Primary Examiner* — Nitin Patel
*Assistant Examiner* — Jeffrey A Parker
(74) *Attorney, Agent, or Firm* — Birch, Stewart, Kolasch & Birch, LLP

(57) ABSTRACT

An input device is provided. The input device includes a first input unit configured to provide at least two directional signals, a second input unit located in the first input unit, the second input unit including a housing and a rotatable member located therein, the second input unit being configured to provide at least two directional signals different from the at least two directional signals of the first input unit, and a circuitry supporting substrate configured to receive a signal that is input through the first input unit and the second input unit. A mobile communication device having the input device is also provided.

6 Claims, 8 Drawing Sheets

INPUT DEVICE AND MOBILE COMMUNICATION DEVICE HAVING SAME

CROSS REFERENCE TO RELATED APPLICATIONS

This application claims the benefit of Korean Application No. 2007-0020416, filed Feb. 28, 2007, and is herein incorporated by reference.

BACKGROUND OF THE INVENTION

1. Field of the Invention

The present invention relates generally to an input device and to a mobile communication having the same, and more particularly, to an input device having two input units and a mobile communication device having the same.

2. Description of Related Art

In general, a mobile communication device includes a mobile phone, a Personal Digital Assistant (PDA), and a mobile PC, and may be an advanced communication appliance that can perform various computer works through a network connection as well as wireless communication regardless independent of location.

Nowadays, the mobile communication device has various additional functions such as the capability to perform an Internet search, play a game, and send/receive E-mail in addition to a communication function for transferring a voice. Accordingly, the mobile communication device has a navigation key that functions as a direction key for enabling a user to easily use various additional functions.

However, in order to move a cursor to a desired position using a conventional button type navigation key, the user is required to perform many repeated operations, and it is inconvenient to use the conventional button type navigation key in an Internet mode and a game mode, which requires quick and minute direction control.

BRIEF SUMMARY OF THE INVENTION

The present invention solves the above problems by providing an input device and a mobile communication device that can implement various user interfaces and also improve ease of manipulation.

According to principles of the present invention, an input device is provided. The input device includes a first input unit configured to provide at least two directional signals, a second input unit located in the first input unit, the second input unit including a housing and a rotatable member located therein, the second input unit being configured to provide at least two directional signals different from the at least two directional signals of the first input unit, and a circuitry supporting substrate configured to receive a signal that is input through the first input unit and the second input unit.

In a further aspect, the rotatable member may be a trackball, and the second input unit may include a rotation detection unit configured to detect the rotation of the trackball.

In a different aspect, the first input unit may include a panel that surrounds the second input unit, and a contact detection unit located on the circuitry supporting substrate, the contact detection unit being arranged to detect movement of the panel in at least two directions.

In still another aspect, the first input unit may include a panel configured to perform an input function when touched by a user, and a sensor located adjacent the panel, the sensor being configured to detect when the panel is touched by a user.

According to principles of the present invention, a mobile communication device is provided. The mobile communication device includes a body, a display located on the body, and an input device configured to control the display. The input device includes a first input unit configured to provide at least two directional signals, a second input unit located in the first input unit, the second input unit including a housing and a rotatable member located therein, the second input unit being configured to provide at least two directional signals different from the at least two directional signals of the first input unit, and a circuitry supporting substrate configured to receive a signal that controls the display that is input through the first input unit and the second input unit.

In a further aspect, the rotatable member may be a trackball, and the second input unit includes a rotation detection unit configured to detect the rotation of the trackball. The second unit may be configured to perform a function corresponding to one of a confirmation key, a selection key, and a mode-switching key when pressed toward the circuitry supporting substrate.

In a different aspect, the first input unit may be configured to perform at least two input operations, each input operation being associated with a different directional signal of the first input unit. The first input unit may include a panel that surrounds the second input unit, and a contact detection unit located on the circuitry supporting substrate, the contact detection unit being arranged to detect movement of the panel in at least two directions.

In still another aspect, the first input unit may be configured to perform an input operation when touched by a user. The first input unit may include a panel, and a sensor located adjacent the panel, the sensor being configured to detect when the panel is touched by a user.

In yet another aspect the first input unit may be configured to perform at least two input operations when pressed by a user and another input operation when touched by a user. The first input unit may include a panel that surrounds the second input unit, a contact detection unit located on the circuitry supporting substrate, the contact detection unit being arranged to detect movement of the panel in the at least two directions when pressed by a user, and a sensor located adjacent the panel, the sensor being configured to detect when the panel is touched by a user.

In a further aspect, the second input unit may be configured to switch the first input unit between a first mode for performing an input operation when pressed by a user and a second mode for performing an input operation when touched by a user.

According to principles of the present invention, another mobile communication device is provided. The mobile communication device includes a body, a display located on the body, and an input device configured to control the display. The input device includes a first input unit configured to move in at least two directions, a second input unit located in the first input unit, and a circuitry supporting substrate configured to receive a signal that controls the display that is input through the first input unit and the second input unit. The second input unit includes a housing, a trackball located in the housing, and a rotation detection unit configured to detect the rotation of the trackball. The first input unit includes a panel that surrounds the second input unit, and a contact detection unit located on the circuitry supporting substrate, the contact detection unit being arranged to detect movement of the panel in the at least two directions.

In a further aspect, the first input unit includes a sensor located adjacent the panel, the sensor being configured to detect when the panel is touched by a user.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Hereinafter, exemplary embodiments according to the present invention will be described in detail with reference to FIGS. 1 to 4.

Figure 1:
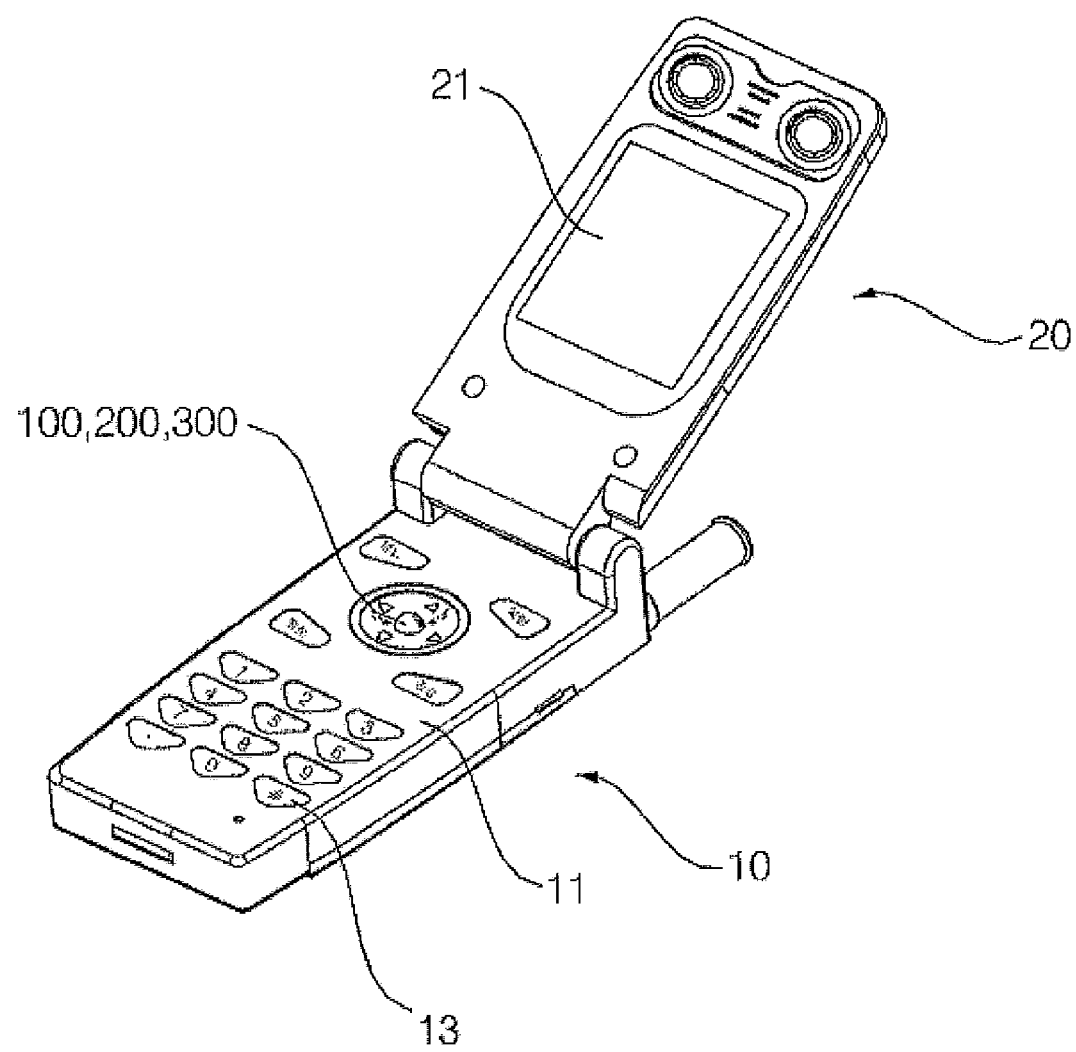
FIG. 1 is a perspective view of a mobile communication terminal according to an exemplary embodiment of the present invention.

FIG. 1 is a perspective view of a mobile communication device according to an exemplary embodiment of the present invention.

The mobile communication device shown in FIG. 1 is a folder type mobile phone, and includes a main body 10 and a folder body 20. In a front case 11 of the main body 10, input devices 100, 200, and 300 for inputting various information to a controller (not shown) and a plurality of button keys 13 are provided. The folder unit 20 includes a display unit 21 for displaying various visible information. While FIG. 1 shows a mobile communication device as a folding type phone, it is understood that the input device 100, 200, 300 are not limited to such use. For example, the input device 100, 200, 300 may also be provided in bar type phones, sliding type phones, combination of the various type phones, as well as in other mobile phones, PDAs and mobile PCs.

Figure 2:
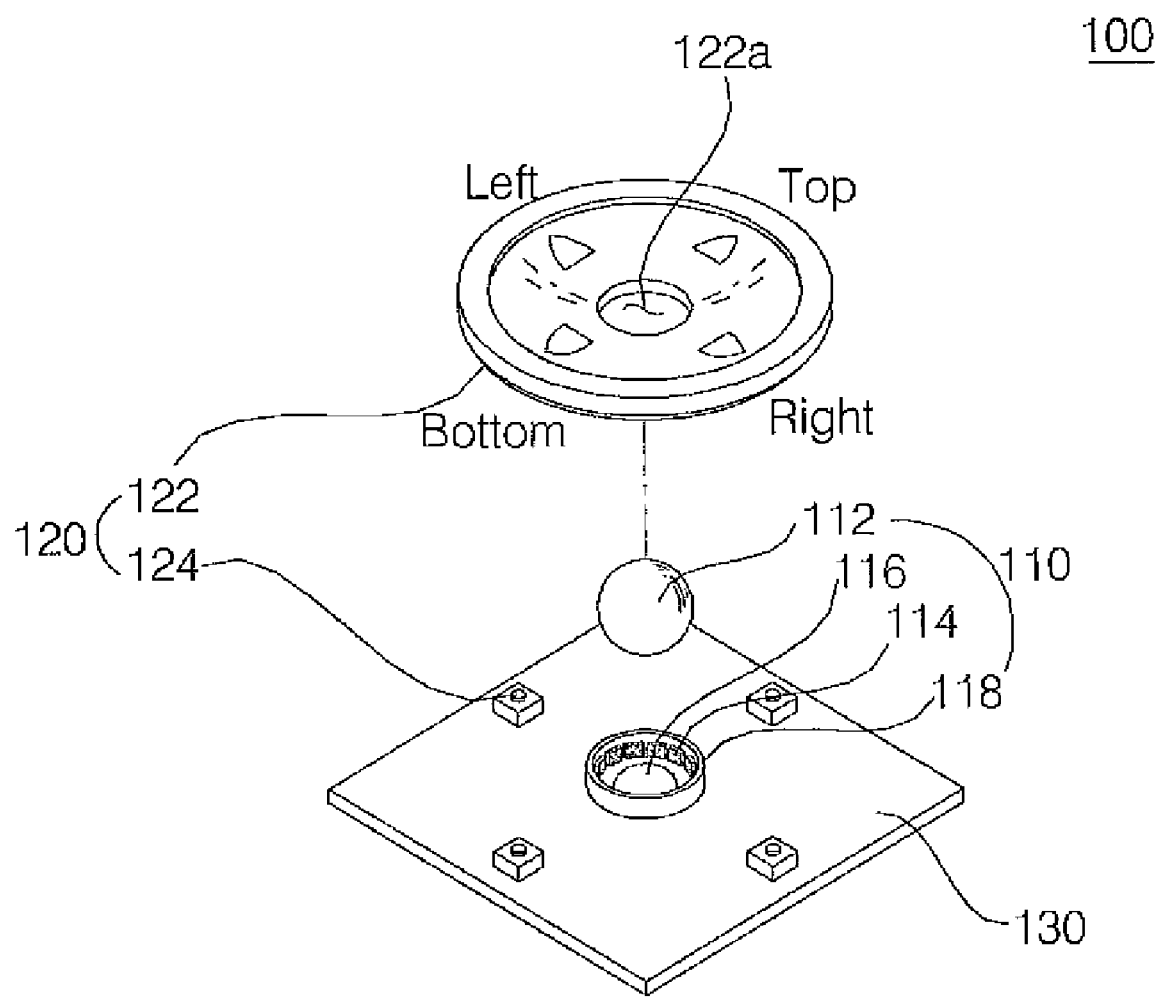
FIG. 2 is an exploded perspective view of an input device of a mobile communication terminal according to an exemplary embodiment of the present invention.
Figure 3:
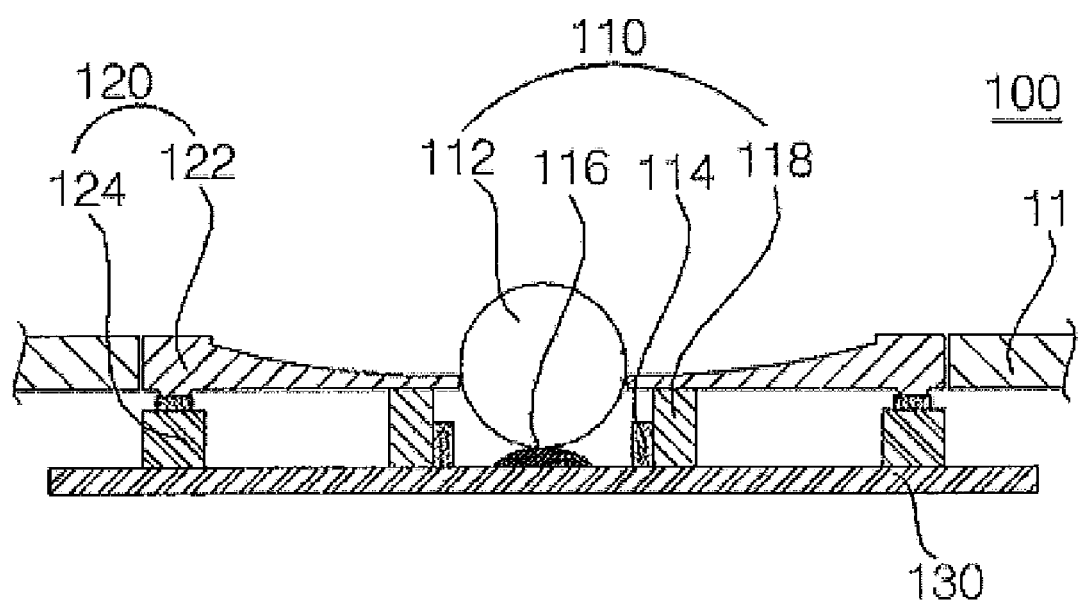
FIG. 3 is a cross-sectional view of the input device shown in FIG. 2.

FIG. 2 is an exploded perspective view of an input device 100 of a mobile communication device according to an exemplary embodiment of the present invention. FIG. 3 is a cross-sectional view of the input device 100 shown in FIG. 2.

Referring to FIGS. 2 and 3, the input device 100 includes a trackball unit 110 (second input unit), a navigation key input unit 120 (first input unit), and a circuitry supporting substrate (CSS) 130, such as a printed circuit board, for receiving a signal that is input through the trackball unit 110 and the navigation key input unit 120.

The trackball unit 110 includes a spherical trackball 112 that is configured to rotate within a housing 118 and a rotation detection unit 114 for detecting the rotation of the trackball 112.

The trackball 112 is provided to rotate within the housing 118 while a part of an upper part thereof is exposed outside of the housing 118.

The housing 118 has a cylindrical shape disposed at the center of the CSS 130 and defines a space for inserting and rotating the trackball 112, and the rotation detection unit 114 for detecting a rotation direction of the trackball 112 is provided within the housing 118. A lower end of the rotation detection unit 114 is electrically connected to the CSS 130 to transfer a rotation manipulation of the trackball 112 by a user to the CSS 130.

The rotation detection unit 114 is formed to detect the rotation of the trackball 112. For example, the rotation detection unit 114 has orthogonal X axis and Y axis that rotates due to frictional contact with the trackball 112 at a lower part of the trackball 112, and includes a sensor for sensing a rotated degree of the X axis and the Y axis. When the trackball 112 is rotated in a specific direction by the user, the rotation detection unit 114 detects the rotation manipulation of the trackball 112 and transfers the corresponding signal to the CSS 130 as a direction input.

In general, a trackball device detects a coordinate on a monitor screen, and is a coordinate input device for inputting position information of the coordinate. The trackball device has the appearance of an inverted mouse shape and operates in a similar manner to that of a mouse, which is an auxiliary input device of a computer. The trackball is widely used in a notebook computer, a keyboard, or a remote control of electronic appliances, and is nowadays used in mobile communication devices. The trackball 110 is well known to those skilled in the art and can be embodied in various forms.

The trackball unit 110 further includes a dome switch 116 for performing a function corresponding to any one of a confirmation key, a selection key, a mode-switching key, or any desirable function when the trackball 112 is pressed downward towards the CSS. The dome switch 116 is disposed in the CSS 130 in a position corresponding to the trackball 112. For example, the dome switch 116 may be provided in a space defined by the housing 118.

The navigation key input unit 120 is adjacently disposed to an outer circumference of the trackball unit 110 and performs at least two input operations with a press method. The navigation key input unit 120 includes a panel 122 disposed to surround the trackball 112 and a contact detection unit 124 disposed on the CSS 130 to detect the manipulation of the panel 122.

As shown in the exemplary embodiment, the panel 122 may be a circular plate, which is supported by an upper end of the housing 118, and has vertical and lateral sides to be pressed down towards the CSS 130. At the center of the panel 122, a central hole 122a is formed to receive the trackball 112 and to expose the trackball 112 to the outside. Further, an upper surface of the panel 122 has a concave central portion for so as not to prevent the direction manipulation toward vertical and lateral sides of the panel 122 by the trackball 112. In addition, arrows for indicating vertical and lateral directions are displayed on the upper surface of the panel 122, as shown in FIG. 2.

Four contact detection units 124 are disposed on the CSS 130 corresponding to vertical and lateral sides of the panel 122. That is, four contact detection units 124 are disposed on and spaced at an interval of 90° on the CSS 130. When the vertical and lateral sides of the panel 122 are pressed down by the user, the contact detection units 124 perform a function of transferring the corresponding signal to the CSS 130.

As seen in FIGS. 2 and 3, a general touch switch can be used as the contact detection unit 124; however, any switch for detecting the movement of the panel 122 and transferring a direction signal to the CSS 130 may be used. For example, as the contact detection unit 124, a dome switch may be used.

Figure 4:
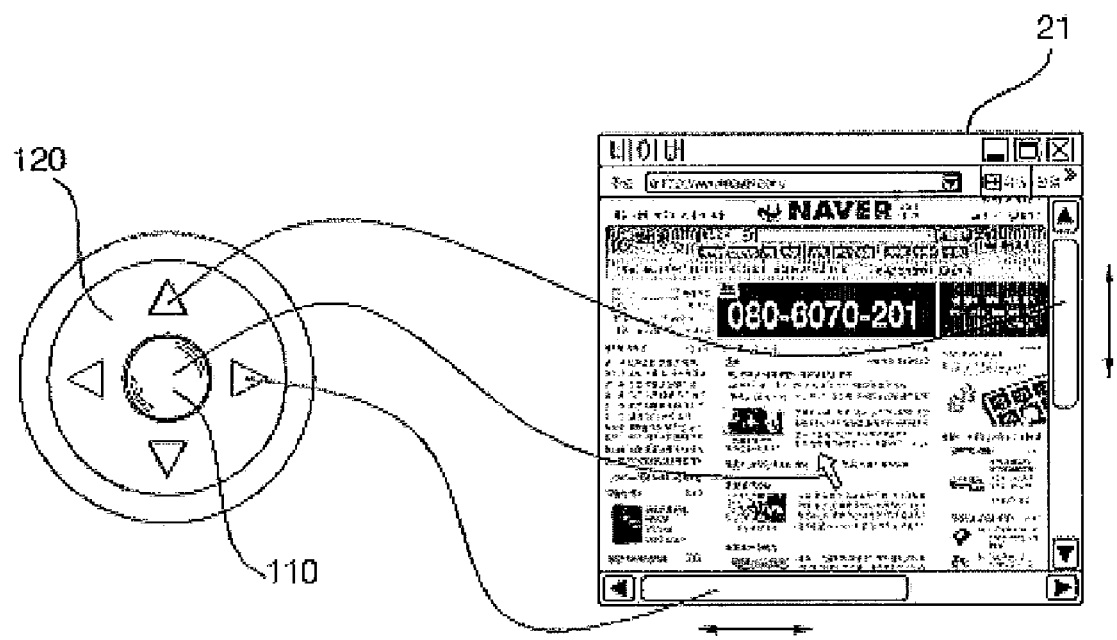
FIG. 4 is a schematic view illustrating an example of using the input device shown in FIG. 2 in an Internet mode.

FIG. 4 is a schematic view illustrating an example of using the input device 100 in an Internet mode.

Referring to FIG. 4, the trackball unit 110 disposed within the input device 100 performs a function of controlling a direction of a cursor displayed on web contents, and the navigation key input unit 120 disposed at the outside of the input device 100 performs a vertical and lateral scroll control function on web contents. Further, the trackball unit 110 enables a user to click on desired web contents.

Because the input device 100 is divided into two independent input means of the trackball unit 110 and the navigation key input unit 120, the direction control of a curse displayed in the display unit can be allocated to the trackball unit 110 for performing an input operation in various directions including vertical, lateral, and diagonal directions. Accordingly, the input device 100 can perform quick and convenient direction control in an Internet mode and a game mode.

Particularly, because the display unit of the mobile communication device has a size much smaller than a monitor of a computer, a scroll function is frequently used during an Internet search, whereby the input device 100 can allocate a vertical and lateral scroll function to the navigation key input unit 120, thereby providing excellent manipulation response.

The input device 100 can be embodied with a user interface of various combinations such as an Internet mode, a game mode, and a camera mode in addition to the example shown in FIG. 4. Furthermore, while a particular web page has been shown, it is merely illustrative of the control functions attributed to the input device 100.

Hereinafter, another exemplary embodiment of the present invention will be described in detail with reference to FIGS. 5 and 6.

Figure 5:
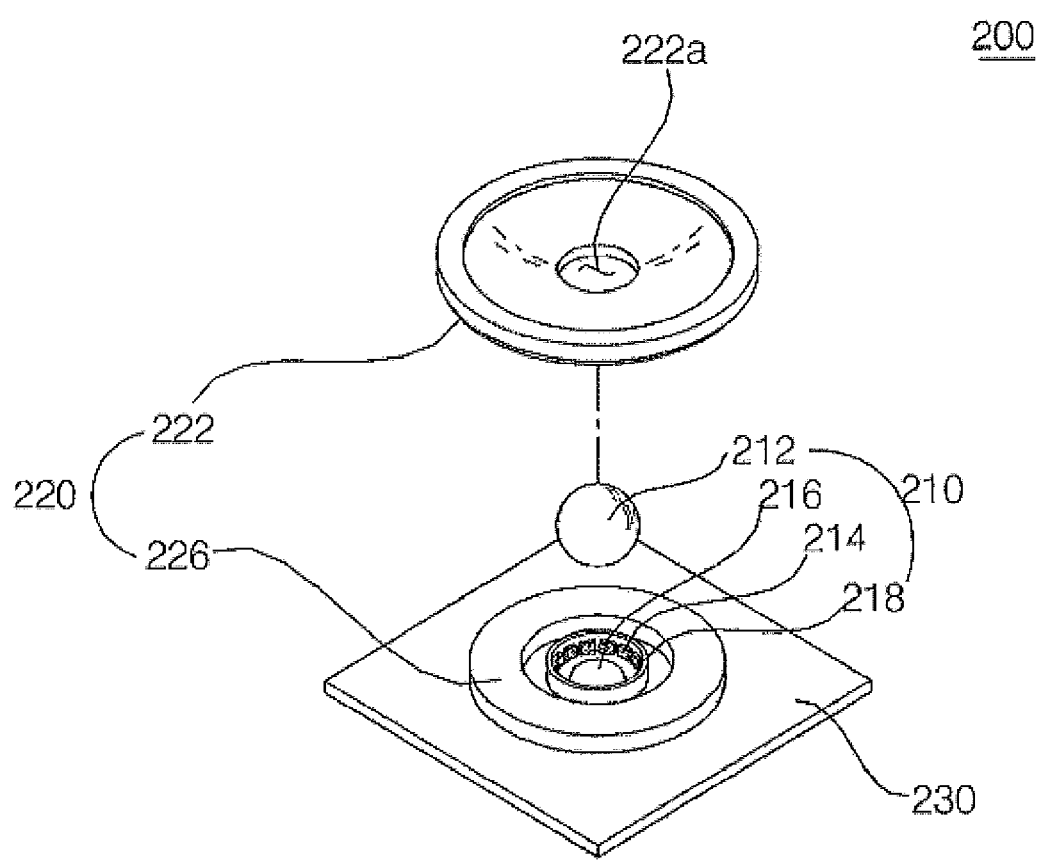
FIG. 5 is an exploded perspective view of an input device of a mobile communication terminal according to another exemplary embodiment of the present invention.
Figure 6:
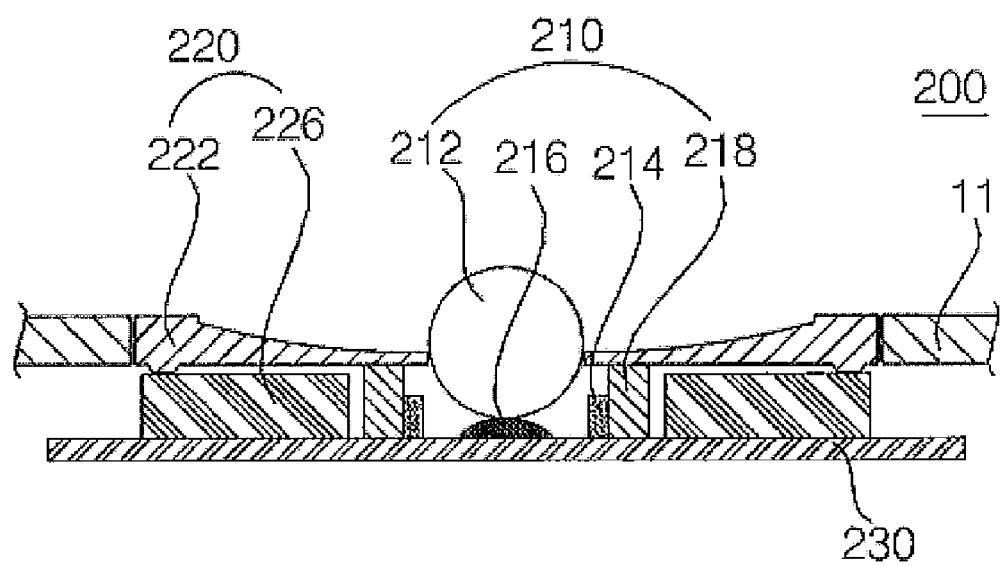
FIG. 6 is a cross-sectional view of the input device shown in FIG. 5.

FIG. 5 is an exploded perspective view of an input device 200 of a mobile communication device according to another exemplary embodiment of the present invention. FIG. 6 is a cross-sectional view of the input device 200 shown in FIG. 5.

The configuration of the input device 200 is substantially identical to that of the input device 100 shown in FIG. 2, except that a navigation key input unit 220 performs an input operation using a touch or sensing method, therefore similar reference numerals have been used to designate substantially identical elements, and descriptions thereof will be briefly described.

The input device 200 includes a trackball unit 210, a navigation key input unit 220 that is adjacently disposed to an outer circumference of the trackball unit 210 and is configured to perform an input operation using a touch method, and a CSS 230 for receiving a signal that is input through the trackball unit 210 and the navigation key input unit 220.

The trackball unit 210 includes a spherical trackball 212 that is configured to rotate within a housing 218 and a rotation detection unit 214 for detecting the rotation of the trackball 212. The trackball unit 210 further includes a dome switch 216 for performing a function corresponding to any one of a confirmation key, a selection key, a mode-switching key, or any other desirable function when the trackball 212 is pressed downward toward the CSS 230. The dome switch 216 is disposed on the CSS 230 in a position corresponding to the trackball 212.

The navigation key input unit 220 is adjacently disposed to an outer circumference of the trackball unit 210 and is configured to perform an input operation using a press method. For this, the navigation key input unit 220 includes a panel 222 that is disposed to surround the trackball 212 and a sensor 226 that is disposed in the CSS to sense a signal changing when a user's finger contacts the panel 222. That is, the navigation key input unit 220 performs an input operation using a touch method. Here, the touch method may include a touch screen method widely used in various terminals and a touch wheel method similar to that employed by an iPod product of the Apple company. Both methods can be used in selecting a menu with a soft touch of a finger.

The sensor 226 has a cylindrical shape to surround a circumference of the housing 218, and uses a pressure detection sensor for sensing an input direction using the pressure change generating when the user's finger contacts with an upper surface of the panel 222 or uses a static electricity detection sensor for sensing an input direction using the static electricity charge generated when the user's finger contacts with the upper surface of the panel 222. While two specific types of sensors for providing a touch method have been described, it is understood that any type sensor suitable for use in a touch method can be applied to the present invention.

The navigation key input unit 220 using the touch method can perform a scroll function in an Internet mode. That is, as the user's finger contacts with the upper surface of the panel 222 and rotates the upper surface in a vertical or lateral direction, a vertical or lateral scroll function can be embodied in an Internet mode.

Hereinafter, another exemplary embodiment of the present invention will be described in detail with reference to FIGS. 7 and 8.

Figure 7:
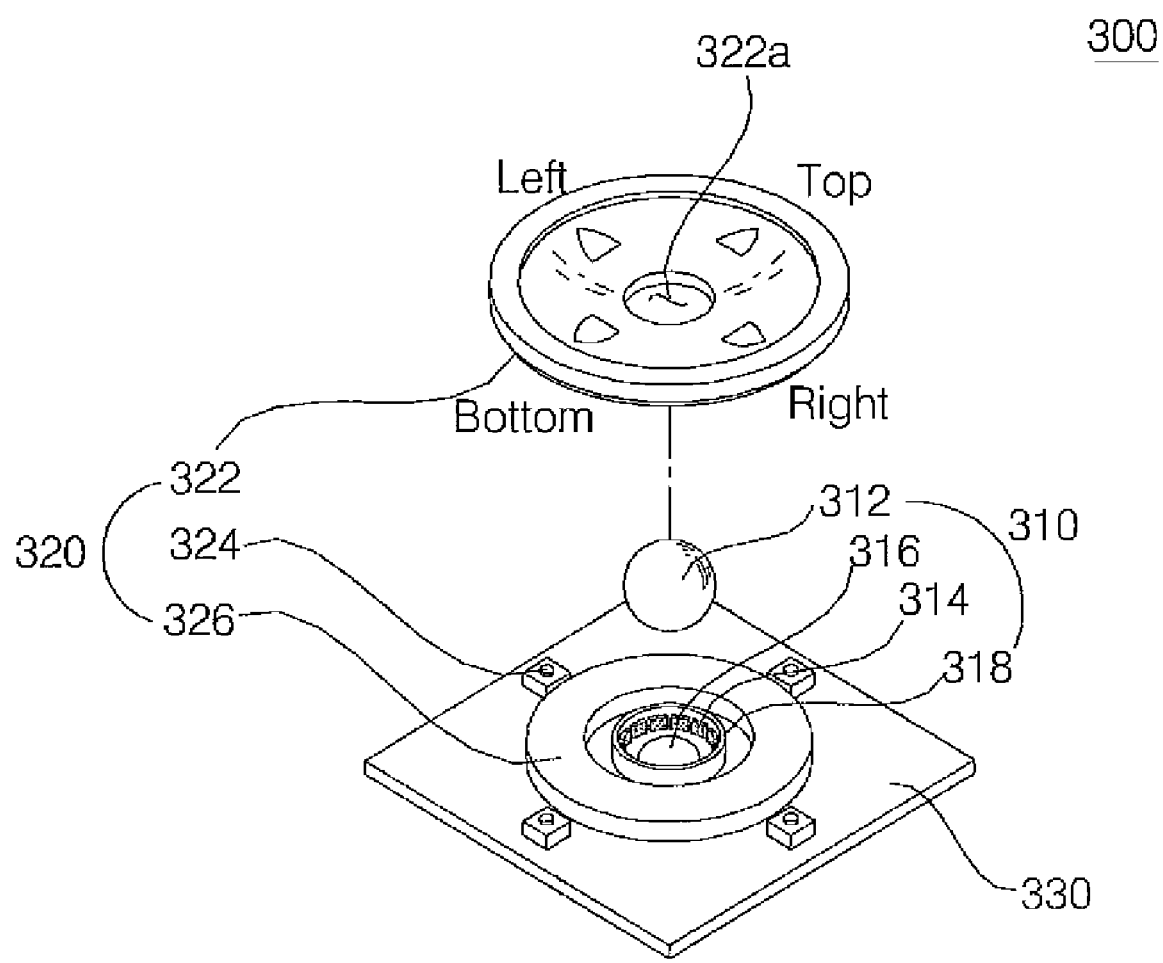
FIG. 7 is an exploded perspective view of an input device of a mobile communication terminal according to another exemplary embodiment of the present invention.
Figure 8:
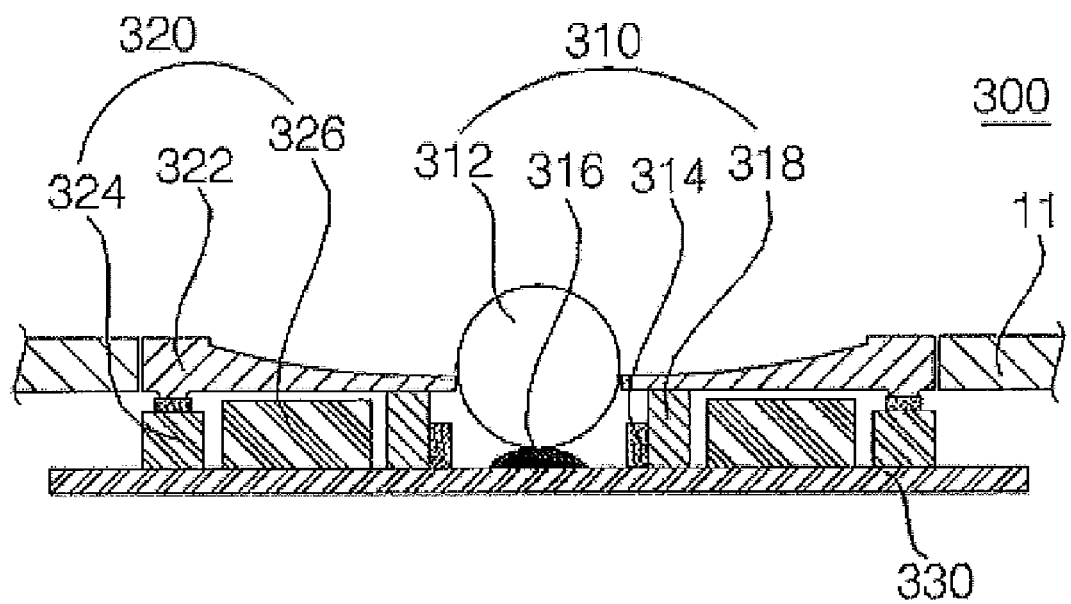
FIG. 8 is a cross-sectional view of the input device shown in FIG. 7.

FIG. 7 is an exploded perspective view of an input device 300 of a mobile communication device according to another exemplary embodiment of the present invention. FIG. 8 is a cross-sectional view of the input device 300 shown in FIG. 7.

The configuration of the input device 300 is substantially identical to that of the input device 100 shown in FIG. 2, except that a navigation key input unit 320 performs an input operation using both a press method and a touch method, therefore similar reference numerals designation substantially identical elements have been used, and descriptions thereof will be briefly described.

The input device 300 includes a trackball unit 310, a navigation key input unit 320 that is adjacently disposed to an outer circumference of the trackball unit 310 and is configured to perform at least two input operations with a pressing method and an input operation with a touching method, and a CSS 330 for receiving a signal that is input through the trackball unit 310 and the navigation key input unit 320.

The trackball unit 310 includes a spherical trackball 312 that is configured to rotate within a housing 318 and a rotation detection unit 314 for detecting the rotation of the trackball 312. The trackball unit 310 further includes a dome switch 316 for performing a function corresponding to any one of a confirmation key, a selection key, a mode-switching key, or any other desirable function, when the trackball 312 is pressed downward towards the CSS 330. The dome switch 316 is disposed in the CSS 330 of a position corresponding to the trackball 312.

The navigation key input unit 320 is adjacently disposed to an outer circumference of the trackball unit 310 and can perform an input operation using both a pressing method and a touching method. For this, the navigation key input unit 320 includes a panel 322 that is disposed to surround the trackball 312 and that has vertical and lateral sides to be pressed down towards the CSS 330, four contact detection units 324 that are disposed on a position of the CSS 330 corresponding to vertical and lateral sides of the panel 322 to detect the manipulation of the panel 322, and a sensor 326 that is disposed on the CSS 330 to detect a signal changing when the user's finger contacts the panel 322. The sensor 326 may be disposed between the housing 318 and the four contact detection units 324, as shown in FIG. 7.

Because the navigation key input unit 320 can perform both the input operation using a pressing method according to the exemplary embodiment shown in FIG. 2 and the input operation using a touching method according to the exemplary embodiment shown in FIG. 5, interfaces of various combinations can be embodied.

The trackball unit 310 can also be used as a mode switching key for performing the switch between a first mode (a direction key mode) of performing an input operation with only a pressing method in the navigation key input unit 320 and a second mode (a touch mode) of performing an input operation with only a touching method in the navigation key input unit 320. This can prevent the user's confusion that may be generated by mixing a press method and a touch method in a specific mode. Particularly, a user unfamiliar with a touch method can use the navigation key input unit 320 with only a press method.

As described above, an input device of a mobile communication device according to the present invention includes two independent input means of a trackball unit and a navigation key input, thereby embodying various user interfaces and improving manipulation response.

The embodiment of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. An input device, comprising:
   a first input unit configured to provide at least two directional signals;
   a second input unit located in the first input unit, the second input unit including a housing having a cylindrical shape, a trackball located in the housing and a rotation detection unit located in an inner side of the housing and configured to detect the rotation of the trackball, the second input unit being configured to provide at least two directional signals different from the at least two directional signals of the first input unit;
   a circuitry supporting substrate configured to receive a signal that is input through the first input unit and the second input unit; and
   a dome switch configured to perform a function corresponding to one of a confirmation key, a selection key, and a mode-switching key when the trackball is pressed downward toward the circuitry supporting substrate, the dome switch being disposed between the circuitry supporting substrate and a lowest position of the trackball and disposed within the housing,
   wherein the first input unit includes:
      a panel that surrounds the trackball, the panel having a concave central portion so as not to prevent the direction manipulation by the trackball, the panel configured to register both a pressing input and a touch input; and
      a contact detection unit located on the circuitry supporting substrate, the contact detection unit being arranged to detect movement of the panel in at least two directions due to a pressing input; and
      a sensor located between the circuitry supporting substrate and the panel, and between the housing and the contact detection unit, the sensor being configured to detect when the panel is touched by a user, and
   wherein the second input unit is further configured to switch the first input unit between a first mode for performing an input operation when pressed by user and a second mode for performing an input operation when touched by user.

2. The input device according to claim 1, wherein the panel is configured to perform an input function when touched by a user.

3. A mobile communication device comprising:
   a body;
   a display located on the body; and
   an input device configured to control the display, the input device including:
      a first input unit configured to provide at least two directional signals;
      a second input unit located in the first input unit, the second input unit including a housing having a cylindrical shape, a trackball located in the housing and a rotation detection unit located in an inner side of the housing and configured to detect the rotation of the trackball, the second input unit being configured to provide at least two directional signals different from the at least two directional signals of the first input unit;
      a circuitry supporting substrate configured to receive a signal that controls the display that is input through the first input unit and the second input unit; and
      a dome switch configured to perform a function corresponding to one of a confirmation key, a selection key, and a mode-switching key when the trackball is pressed downward toward the circuitry supporting substrate, the dome switch being disposed between the circuitry supporting substrate and a lowest position of the trackball and disposed within the housing,
      wherein the first input unit includes:
         a panel that surrounds the trackball, the panel having a concave central portion so as not to prevent the direction manipulation by the trackball, the panel configured to register both a pressing input and a touch input; and
         a contact detection unit located on the circuitry supporting substrate, the contact detection unit being arranged to detect movement of the panel in at least two directions due to a pressing input; and
         a sensor located between the circuitry supporting substrate and the panel, and between the housing and the contact detection unit, the sensor being configured to detect
      when the panel is touched by a user, and
   wherein the second input unit is further configured to switch the first input unit between a first mode for performing an input operation when pressed by user and a second mode for performing an input operation when touched by user.

4. The mobile communication device according to claim 3, wherein the first input unit is configured to perform at least two input operations, each input operation being associated with a different directional signal of the first input unit.

5. The mobile communication device according to claim 3, wherein the first input unit is configured to perform an input operation when touched by a user.

6. The mobile communication device according to claim 3, wherein the first input unit is configured to perform at least two input operations when pressed by a user and another input operation when touched by a user.

* * * * *